US010454996B2

(12) United States Patent
Motes et al.

(10) Patent No.: US 10,454,996 B2
(45) Date of Patent: *Oct. 22, 2019

(54) SYSTEMS AND METHODS FOR DOWNLOADING FILES

(71) Applicant: Dropbox, Inc., San Francisco, CA (US)

(72) Inventors: Aston Motes, San Francisco, CA (US); Makinde Adeagbo, San Francisco, CA (US); Trevor Berg, San Francisco, CA (US)

(73) Assignee: DROPBOX, INC., San Francisco, CA (US)

(*) Notice: Subject to any disclaimer, the term of this patent is extended or adjusted under 35 U.S.C. 154(b) by 253 days.

This patent is subject to a terminal disclaimer.

(21) Appl. No.: 15/481,758

(22) Filed: Apr. 7, 2017

(65) Prior Publication Data

US 2017/0310737 A1    Oct. 26, 2017

Related U.S. Application Data

(63) Continuation of application No. 14/108,054, filed on Dec. 16, 2013, now Pat. No. 9,628,546, which is a continuation of application No. 13/776,341, filed on Feb. 25, 2013, now Pat. No. 8,639,781.

(60) Provisional application No. 61/716,300, filed on Oct. 19, 2012.

(51) Int. Cl.
H04L 29/08 (2006.01)

(52) U.S. Cl.
CPC ............. *H04L 67/06* (2013.01); *H04L 67/02* (2013.01); *H04L 67/20* (2013.01)

(58) Field of Classification Search
CPC .......... H04L 29/0809; H04L 29/08117; H04L 67/02; H04L 67/06; H04L 67/20; G06Q 30/02
USPC ....................................................... 709/219
See application file for complete search history.

(56) References Cited

U.S. PATENT DOCUMENTS

| 6,757,716 | B1 | 6/2004 | Blegen et al. | |
|---|---|---|---|---|
| 8,122,102 | B2* | 2/2012 | Wein | H04L 67/1008 709/219 |
| 8,365,235 | B2* | 1/2013 | Hunt | G06F 3/04817 725/88 |
| 8,566,442 | B2* | 10/2013 | Jiang | H04N 17/004 709/224 |
| 8,606,996 | B2* | 12/2013 | Richardson | G06F 12/0813 711/122 |

(Continued)

Primary Examiner — Tauqir Hussain
(74) Attorney, Agent, or Firm — Polsinelli PC

(57) ABSTRACT

Systems according to various embodiments use a file download widget to facilitate the download of one or more files from one or more servers associated with a website. In particular embodiments, the file download widget may be used to facilitate the download of one or more particular files that are associated with the widget directly to a content management system, such as a synched or non-synched cloud-based content management system. In various embodiments, this may: (1) allow the user to download files for later use without storing the downloaded files on the user's computing device; and (2) allow the user to complete the download of files by initiating the transfer of files and then logging off of the website (and/or powering down their computing device) before the transfer of files is complete, which may result in a more convenient and enjoyable download process.

24 Claims, 7 Drawing Sheets

(56) References Cited

U.S. PATENT DOCUMENTS

| | | | |
|---|---|---|---|
| 8,972,290 B2* | 3/2015 | Rendich | G06Q 10/02 705/26.2 |
| 9,613,104 B2* | 4/2017 | Smith | G06F 11/1446 |
| 2003/0018917 A1 | 1/2003 | Brown | |
| 2004/0019497 A1 | 1/2004 | Volk et al. | |
| 2006/0179155 A1 | 8/2006 | Bunting et al. | |
| 2006/0230170 A1 | 10/2006 | Chintala et al. | |
| 2009/0322790 A1 | 12/2009 | Behar et al. | |
| 2010/0075641 A1 | 3/2010 | Schwartz | |
| 2011/0185041 A1* | 7/2011 | Hunt | H04L 65/1069 709/219 |
| 2011/0238789 A1* | 9/2011 | Luby | H04N 21/23106 709/219 |
| 2012/0072542 A1* | 3/2012 | McGowan | H04L 67/06 709/219 |
| 2012/0084399 A1* | 4/2012 | Scharber | H04L 67/34 709/219 |
| 2012/0110515 A1 | 5/2012 | Abramoff et al. | |
| 2012/0278449 A1 | 11/2012 | Wu et al. | |
| 2013/0054760 A1 | 2/2013 | Bae et al. | |
| 2013/0159473 A1* | 6/2013 | Newton | H04L 67/2852 709/219 |
| 2013/0254343 A1* | 9/2013 | Stevens | H04L 63/20 709/219 |
| 2014/0025799 A1 | 1/2014 | Azizi et al. | |
| 2014/0052825 A1* | 2/2014 | Luecke | H04L 67/327 709/219 |

* cited by examiner

SYSTEMS AND METHODS FOR DOWNLOADING FILES

CROSS-REFERENCE TO RELATED APPLICATIONS

This application is a continuation of U.S. application Ser. No. 14/108,054, filed on Dec. 16, 2013, entitled, "SYSTEMS AND METHODS FOR DOWNLOADING FILES", which is a continuation of U.S. patent application Ser. No. 13/776,341, filed on Feb. 25, 2013, entitled, "SYSTEMS AND METHODS FOR DOWNLOADING FILES", which claims the benefit of priority under 35 U.S.C. § 119(e) to U.S. Provisional Patent Application 61/716,300, filed Oct. 19, 2012, entitled, "SYSTEMS AND METHODS FOR DOWNLOADING FILES"; all of which are hereby expressly incorporated herein by reference in their entireties.

BACKGROUND

In order to download content from a website, such as a photo sharing website, a user typically downloads the content from the website on which the content is stored to a local computing device. This download process can be extremely time consuming—especially when large photo or video files are involved. Current systems typically also require content to be stored locally after the content is downloaded, which can be impractical for users who wish to download large amounts of content, or who are working with client devices, such as smart phones, that may have limited local memory. Accordingly, there is currently a need for improved systems and methods for downloading content from a website to one or more servers associated with a cloud-based content management system, or other remote computers.

SUMMARY

A computer-implemented method, according to various embodiments, may include the activation of a file download widget by a user on a website and facilitating the download of a particular file to a cloud-based content management system. The method may also include adding the particular file to the user's account within the content management system.

A computer-implemented method, according to further embodiments, may include providing a file access widget on a website. The file access widget may be configured so that, in response to the file access widget being activated by a user, a particular file is downloaded directly from the website to a cloud-based content management system. The file access widget may also be configured to add to a user's account within the content management system.

A non-transitory computer-readable medium, according to various embodiments, may be configured for storing computer-executable instructions for creating a file download widget for use on a website. The file download widget may be configured to facilitate a download, from the website, of one or more files to an account that is associated with a user within a cloud-based content management system. In some cases, the cloud-based content management system may already have a file. In such a case, the cloud-based content management system can be configured to not download the file, but instead use the previously downloaded copy and associate the previously downloaded copy with the user's account.

A computer system, according to particular embodiments, may include at least one processor and memory. The computer system may be configured for an activation of a file download widget by a user on a website and facilitating a selection of a particular file associated with the website. Moreover, the file download widget may be configured for receiving an indication that the user has selected the particular file. The indication may include notice that the user has selected the particular file and facilitated a download, from the website, of the particular file to an account that is associated with a user within a cloud-based content management system.

BRIEF DESCRIPTION OF THE DRAWINGS

Various embodiments of a computer system for downloading files are described below. In the course of this description, reference will be made to the accompanying drawings, which are not necessarily drawn to scale, and wherein.

DETAILED DESCRIPTION

Various embodiments now will be described more fully hereinafter with reference to the accompanying drawings. It should be understood that the invention may be embodied in many different forms and should not be construed as limited to the embodiments set forth herein. Like numbers refer to like elements throughout.

Overview

Various embodiments may use a file download widget to facilitate the download of one or more files from one or more servers associated with a website. In particular embodiments, the file download widget may be used to facilitate the download of one or more particular files that are associated with the widget directly to a content management system, such as a synched or non-synched cloud-based content management system. In various embodiments, this may: (1) allow the user to download files for later use without storing the downloaded files on the user's local computing device; and (2) allow the user to complete the download of files by initiating the transfer of files and then logging off of the website (and/or powering down their computing device) before the transfer of files is complete, which may result in a more convenient and enjoyable download process. In certain embodiments, the download process may be faster than a download to a user's local computing device, because the files at issue may be transferred directly from the website's servers to the content management system's servers.

In various embodiments, the file download widget may include a user interface element (e.g., a button, dialog box, or menu bar) that allows a user to select and/or initiate the download of one or more files that are stored on the website. In certain embodiments, the user interface element may be configured to automatically initiate the download of one or more particular files from the website in response to the user interface element being activated (e.g., selected by a pointing device) by a user. The file download widget may be implemented, for example, by pasting a small piece of HTML code into the HTML code of a particular website. The code may be provided by the content management system.

Various embodiments may be particularly useful in conjunction with facilitating the download of files from a website to a synched, cloud-based content management system, such as the Dropbox™ Service, which is offered by Dropbox, Inc. of San Francisco, Calif. However, it should be understood that the system may be used in conjunction with any other suitable cloud-based or non-cloud based content management system.

More Detailed Discussion

Figure 1:
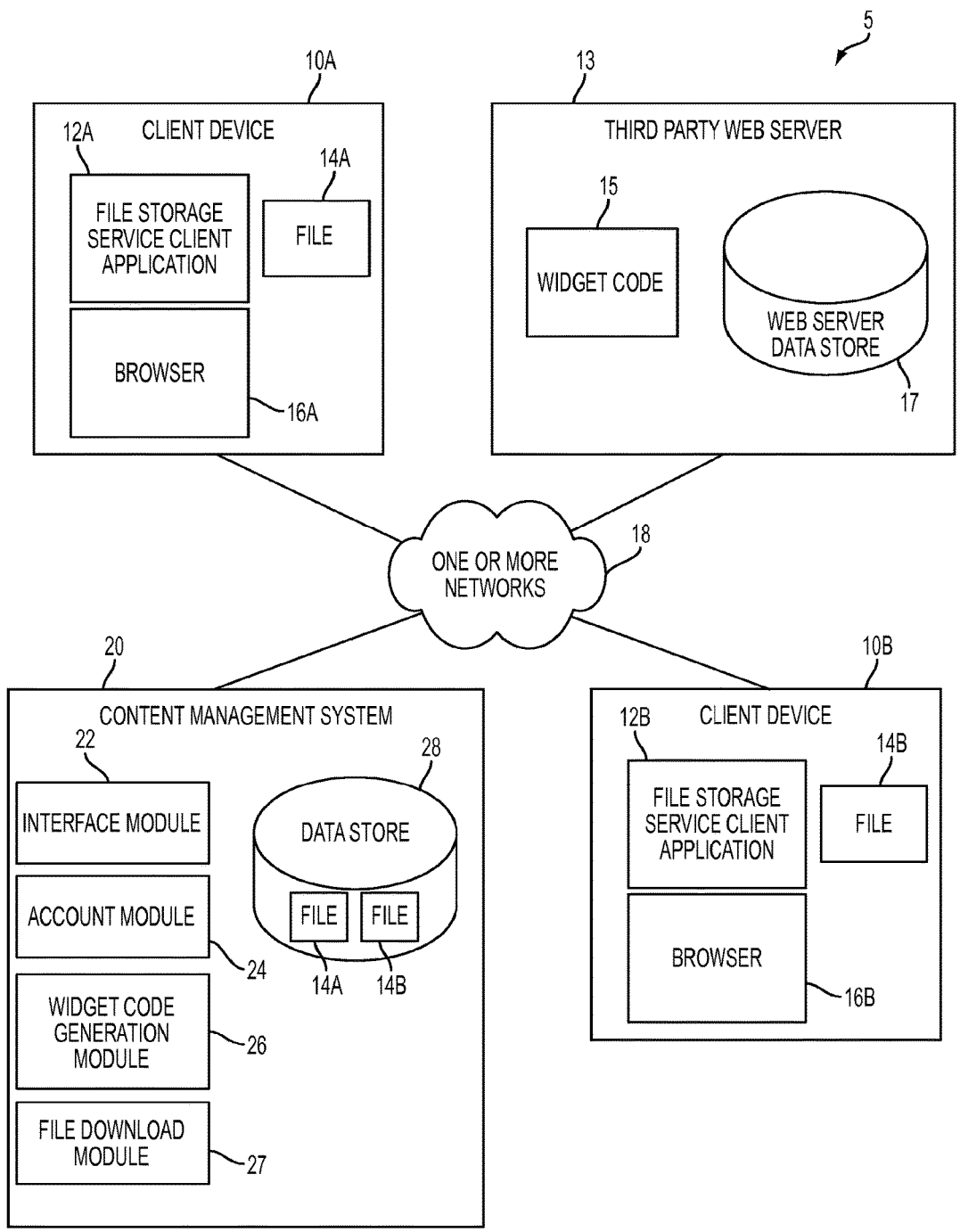
FIG. 1 shows a block diagram of a content management environment in which one or more widgets on a website may be used to download files from the website to a content management system, in accordance with a particular embodiment.

FIG. 1 shows a content management environment 5 according to various embodiments. As may be understood from this figure, content management environment 5 includes a plurality of client devices 10A and 10B (collectively 10), a third party web server 13, and a content management system 20, which are all interconnected by one or more networks 18. Various aspects of the client devices 10, third party web server 13, and content management system 20 are discussed below.

Client Devices

In various embodiments, each client device 10 may selectively execute a file storage service client application 12A and 12B (collectively 12), which may be used to manage files stored within a content management system 20. It is noted that, in some embodiments, synchronized copies of files 14A and 14B may be kept on both content management system 20 and each respective client device 10. In some embodiments, client devices 10 may provide a file-browser type interface (not shown) for directly manipulating the files stored on content management system 20 without maintaining a local copy. Client devices 10 may also include a web browser 16A and 16B (collectively 16) for retrieving and presenting web pages (such as web pages associated with the third party web server 13) and other content from other webservers. Examples of suitable web browsers for use by the client devices 10 include FIREFOX®, GOOGLE CHROME™, INTERNET EXPLORER®, and SAFARI®.

Still referring to FIG. 1, while only two client devices 10A and 10B are shown for purposes of clarity, it should be understood by those skilled in the relevant field that many client devices may simultaneously connect through network (s) 18 to content management system 20 and third party web server 13 at any given time. Examples of suitable client devices 10 include, but are not limited to, a desktop computer, a mobile computing device such as a laptop, a tablet, and handheld devices, such as a smart phone (e.g., an IPHONE®, BLACKBERRY®, or ANDROID™-based smart phone). Each client device 10 may store a local, synched copy of one or more files from within content management system 20, and the files may be stored in any suitable file format. When file storage service client application 12 presents files that are stored within the file storage system to a user, the files may be arranged in folders and the folders themselves may be arranged in other folders, or in any other arbitrary arrangement supported by content management system 20, as determined by the user. However, one of skill in the art should understand in light of this disclosure that each user's file storage architecture may be considerably different from the next, and in some instances, the file storage architecture may be implemented to maximize storage and file retrieval efficiency.

Content Management System

Content management system 20 stores files and manages access to those files via client devices 10. Content management system 20 and its components may be implemented using any appropriate hardware and software for file serving, storage, and retrieval functions. For example, content management system 20 may be implemented in the form of a single server or multiple servers.

In various embodiments, content management system 20 includes interface module 22, account module 24, widget code generation module 26, file download module 27, and data store 28. Each of these elements of content management system 20 is discussed below.

Content Management System—Interface Module

In particular embodiments, interface module 22 facilitates file access and file storage between content management system 20 and client devices 10. Interface module 22 receives files from and sends files to client devices 10 consistent with the user's preferences for sharing files. Interface module 22 may act as the counterpart to a client-side file-explorer style user interface that allows a user to manipulate files directly stored on content management system 20. In some embodiments, software operating on client devices 10 may integrate network-stored files with the client's local file system to enable a user to manipulate network-stored files through the same user interface (UI) used to manipulate files on the local file system, e.g., via a file explorer, file finder or browser application. As an alternative or supplement to the client-side file-explorer interface, interface module 22 may provide a web interface for client devices 10 to access (e.g. via suitable browser 16) and allow a user to manipulate files stored within content management system 20. In this way, the user can directly manipulate files stored within content management system 20.

Content Management System—Data Store

In various embodiments, data store 28 may store files such as those downloaded using client devices 10, or using any other suitable computing device. In the embodiment illustrated in FIG. 1, client 10A, which is associated with a first user, is shown as locally storing at least one file 14A, and client 10B, which is associated with a second user, is shown as locally storing at least one file 14B. As shown in FIG. 1, copies of the locally stored files are maintained in content management system's data store 28.

In various embodiments, data store 28 may maintain information identifying the user, information describing the user's file directory, and other information in a file journal that is maintained for each user. In some embodiments, the file journal may be maintained on content management system 20, and in other embodiments, a file journal (e.g., a "server-side file journal") may be maintained on both content management system 20 and locally on each client device 10. In various embodiments, the file journal may be used to facilitate the synchronization of the various copies of a particular file that are associated with a user's account.

As a particular example, in the embodiment shown in FIG. 1, the system may be configured so that any changes that are made to file 14A on particular client device 10A will also be automatically reflected in the copy of file 14A stored within content management system 20. Similarly, any changes that are made to file 14A on content management system 20 may also be automatically reflected in the copy of file 14A stored on client device 10A.

Content Management System—Account Module

In particular embodiments, account module 24 may track files stored in data store 28 and entries in the server-side file journal for each file. As users grant file access permissions to other users, account module 24 may update the server-side file journal associated with each relevant user in data store 20. Account module 24 may also track client devices 10 that are associated with each user's account. For example, a user may want to share all their files between their desktop computer, tablet computer, and handheld device. To make such a sharing arrangement seamless to the user, the user's single account on content management system 20 may be associated with each of the user's respective client devices. In some embodiments, an application running on each respective client device 10 may help to coordinate synchronization of files on the client device with corresponding versions of the files within the user's account in content management system 20, and also with corresponding versions of the files stored on the user's various other client devices.

Content Management System—Widget Code Generation Module

In particular embodiments, widget code generation module 26 may be configured to generate code that may be used to create a file download widget on a third party website. In particular embodiments, this code may be HTML code that may be pasted into a third party website (or other website) to create the file download widget. In particular embodiments, the file download widget may include a button that may be used to enable the download of one or more files directly from the third party website to a content management system, such as a cloud-based content management system. In some embodiments, each widget may be customized to facilitate the download of one or more specific files. In other embodiments, the widget may include functionality that allows users to select one or more files for download (e.g., via a suitable file picker).

Figure 2:
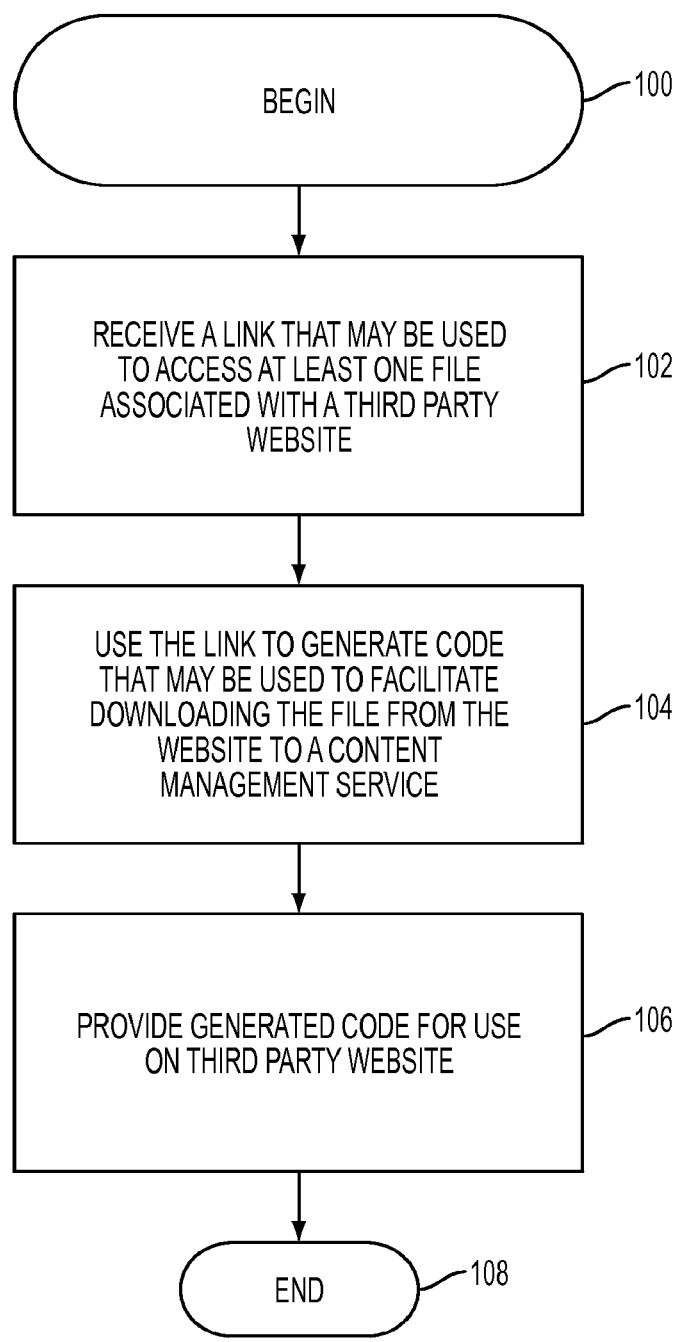
FIG. 2 shows a flow chart illustrating steps executed by a widget code generation module according to a particular embodiment.

FIG. 2 illustrates various steps that are executed by widget code generation module 26 according to a particular embodiment. As may be understood from this figure, when executing this module, the process begins at step 102, where the system may receive a link (e.g., a URL) that may be used to access at least one file associated with a third party website. In particular embodiments, the at least one file may be stored on one or more servers associated with the website.

Next, at step 104, the system may use the link to generate code (e.g., HTML code) that may be used to facilitate downloading the at least one file from the third party website to the content management system. The system then advances to step 106, where the system may provide the generated code for use on the third party website. The system may do this, for example, by displaying the generated code on a suitable display screen so that the user may copy the code in any suitable way. Finally, the system advances to step 108 where it may complete execution of the widget code generation module 26.

Content Management System—File Download Module

Figure 3:
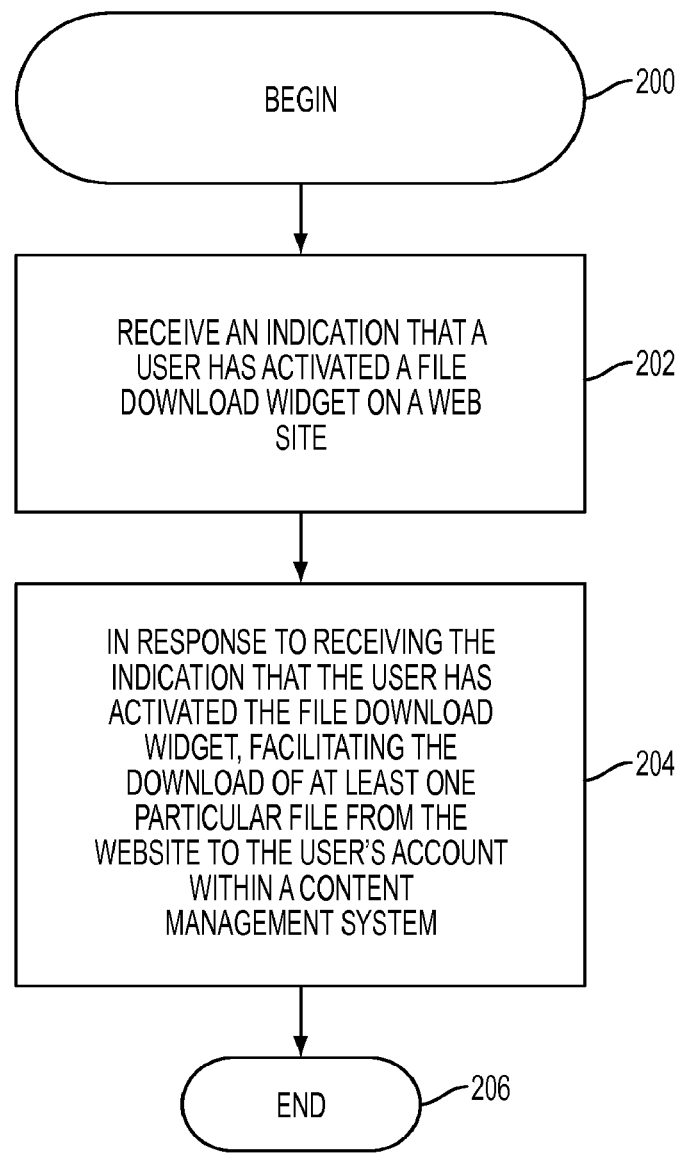
FIG. 3 shows a flow chart illustrating steps executed by a file download module according to a particular embodiment.

FIG. 3 shows functions of file download module 27 according a particular embodiment. For purposes of the discussion below, this module is executed by content management system 20. However, in other embodiments, file download module 27 may be executed by any other suitable computer system. As may be understood from this figure, when executing this module, content management system 20 begins at step 202, where it receives an indication that a user has activated a file download widget on a third party website. In particular embodiments, content management system 20 may receive this indication from web server 13 associated with the website. This indication may, for example, reflect that a user has selected a suitable button (e.g., an "Add to My Dropbox" button), that is associated with at least one specific file on the website. Content management system 20 may receive this indication via an API associated with content management system 20, along with a URL that may be used to access the file and a site ID for the website.

Next, at step 204, in response to receiving the indication, content management system 20 facilitates the download of the at least one specific file from the website to the user's account in content management system 20. In particular embodiments, in this step, content management system 20 may use the URL associated with the one or more files and the site ID of the third party website to initiate (e.g., request) the download of the file from one or more servers 13 associated with the third party website via one or more networks 18, such as the Internet. Finally, the system ends the process at step 206.

In particular embodiments, rather than being associated with at least one specific file, the file download widget may be adapted to allow a user to select one or more files for download from the website to content management system 20. In such an embodiment, the file download widget may be adapted so that activating the file download widget will cause the system to display a file picker user interface that a user may use to select one or more files for download from the website.

Also, in certain embodiments, the file download widget may be adapted to allow a user to select a target location (e.g., a folder) from within their account on the content management system to download the files to. For example, the system may be adapted to allow a user to indicate that the user wishes to download the photo from the website to a "photo" folder within the user's account on the content management system.

In particular embodiments, when executing the steps above, file download module 27 may facilitate the transfer of one or more files directly from the website to one or more servers associated with content management system 20. In various embodiments, this may: (1) allow the user to download files for later use without having to download the files to the user's local computing device; and (2) allow the user to complete the download of files by initiating the transfer of files and then logging off the website (and/or powering down their computing device) before the transfer of files is complete, which may result in a more convenient and enjoyable download process. In certain embodiments, the download process may also be faster than a download from a user's local computing device, since the files at issue may be transferred directly from the content management system's servers to the website's servers.

In some embodiments, file download module 27 may detect that at least one of the one or more files has already been downloaded to the content management system. In this cases, file download module 27 can be configured to not download a new copy of the file, but instead use the previously downloaded copy and associate the previously downloaded copy with the user's account.

Exemplary User Experience

FIGS. 4-7 provide an example of the use of file download widget 310 within the context of a third party photo sharing website. These figures represent interfaces displayed on tablet computers, desktop computers, laptops, mobile devices, handheld devices such as smart phones, and other similar devices. The interfaces may be used by a user of a particular content management system to download files from a third party website to the user's account within the content management system.

Figure 4:
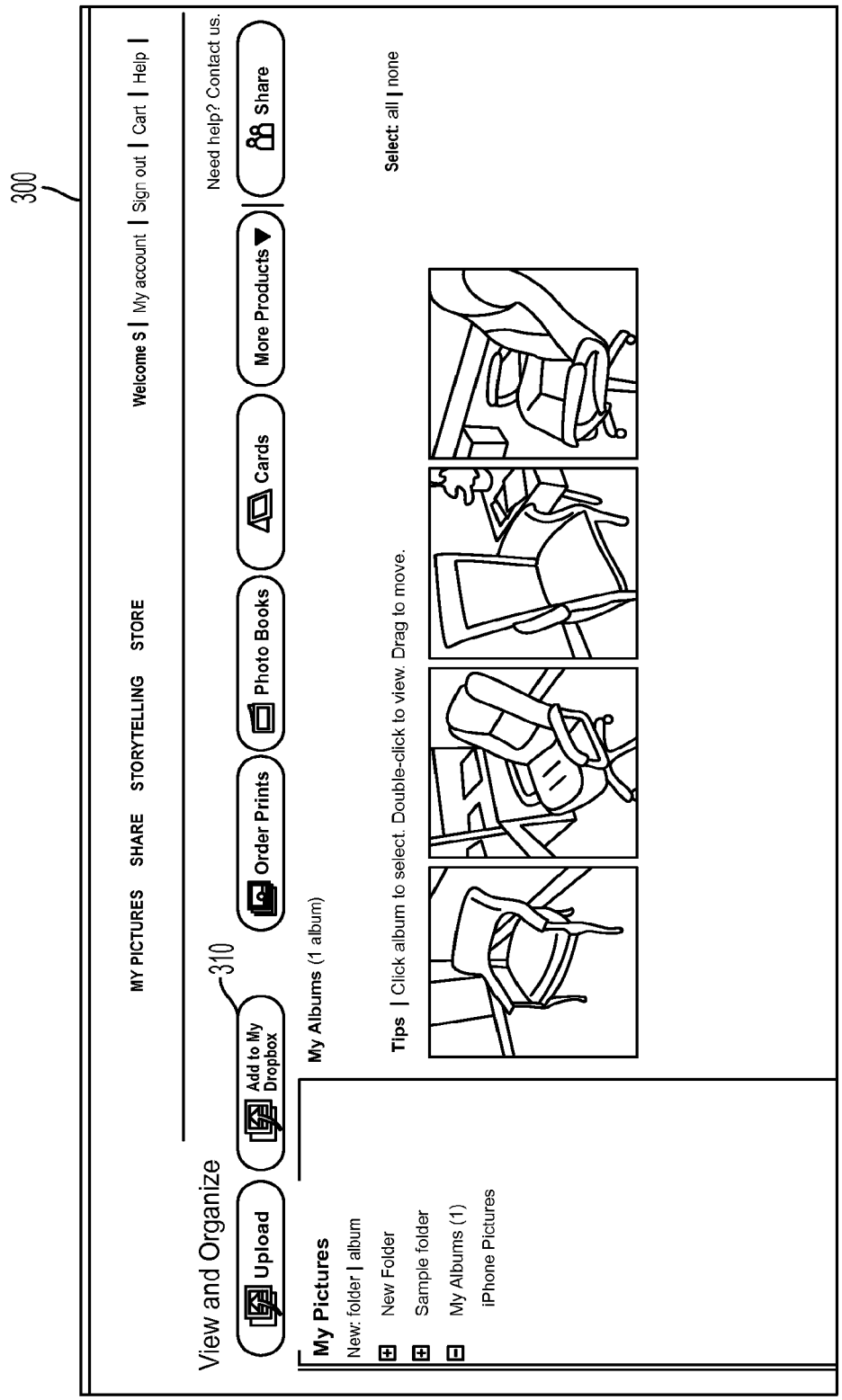
FIG. 4 shows a website that includes a file download widget according to a particular embodiment.

FIG. 4 is a screen shot of an exemplary user interface on a third party website for downloading files to the content management system from the third party website. The third party website shown in this figure is a photo storage and sharing website (e.g., Shutterfly 300). User interfaces for downloading files from third party websites to a content management system may be substantially integrated (e.g., integrated) in any third party website from which a user may desire to add files to the user's content management system account (e.g., social networking websites such as Facebook; content management services such as Dropbox™, etc.). As may be understood from FIG. 4, the third party website may include "Add to My Dropbox" Button 310, which a user may select in order to download files to the user's content management system account (e.g., Dropbox account) from the third party website.

Figure 5:
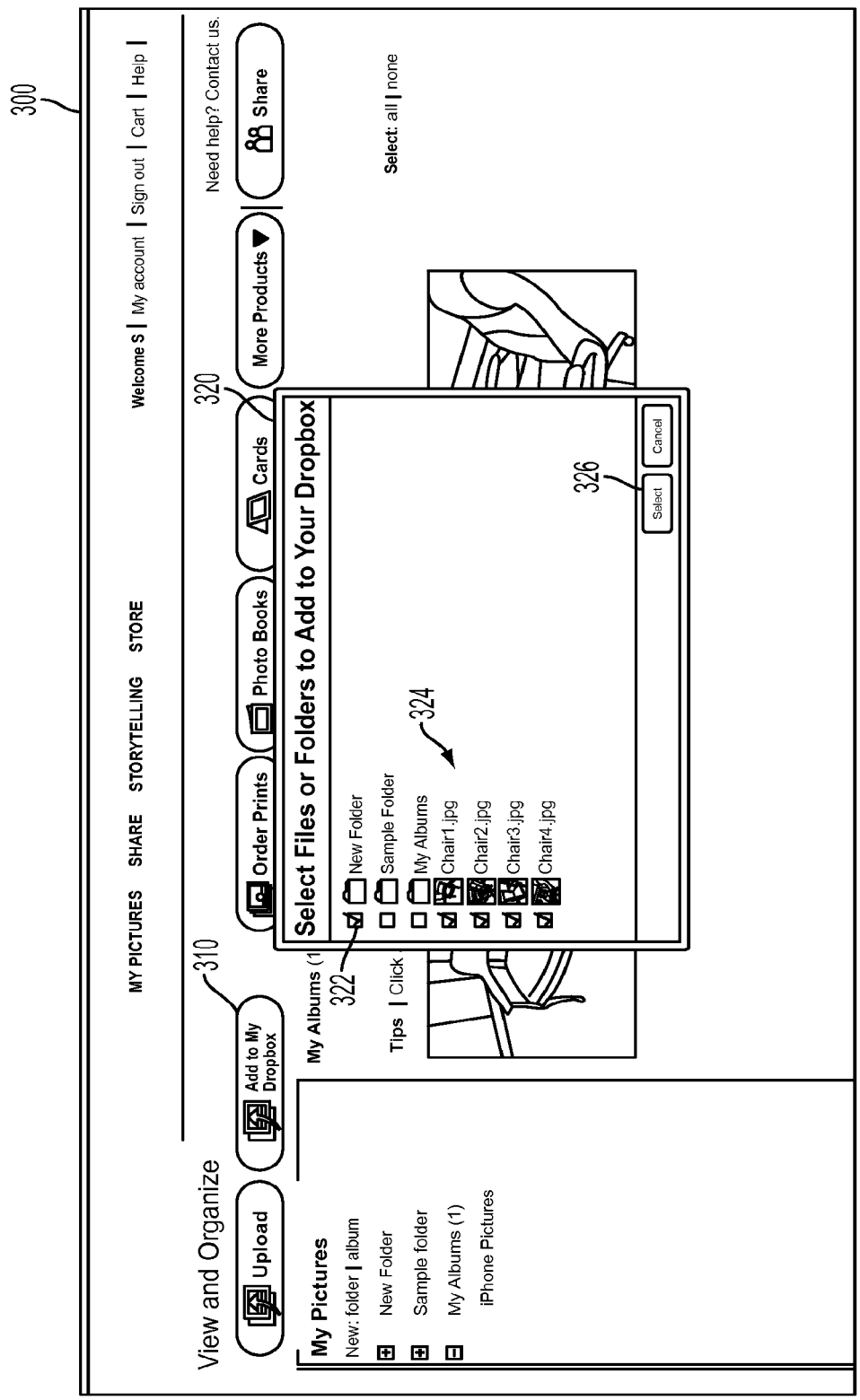
FIG. 5 shows a file selection interface according to a particular embodiment.

In particular embodiments, in response to the user's selection of "Add to My Dropbox" Button 310, the system may be configured to display file selection interface 320 to the user as shown in FIG. 5. In the embodiment shown in this figure, file selection interface 320 may include a listing of files on the third party website to which the user has access. For example, in the case of a file selection interface on a photo storing service such as those provided by Shutterfly, Inc., the file selection interface may include a listing of files and folders that are available to the user (e.g., that are currently stored on the photo sharing website). As may be understood from this figure, the system may be configured to allow the user to utilize this interface to select files from the third party site to download to the content management system. The user may select individual files or folders 324 to add to the user's content management system account (e.g., by selecting indicia 322 adjacent the file or folder that the user wishes to add to the user's content management system account).

Figure 6:
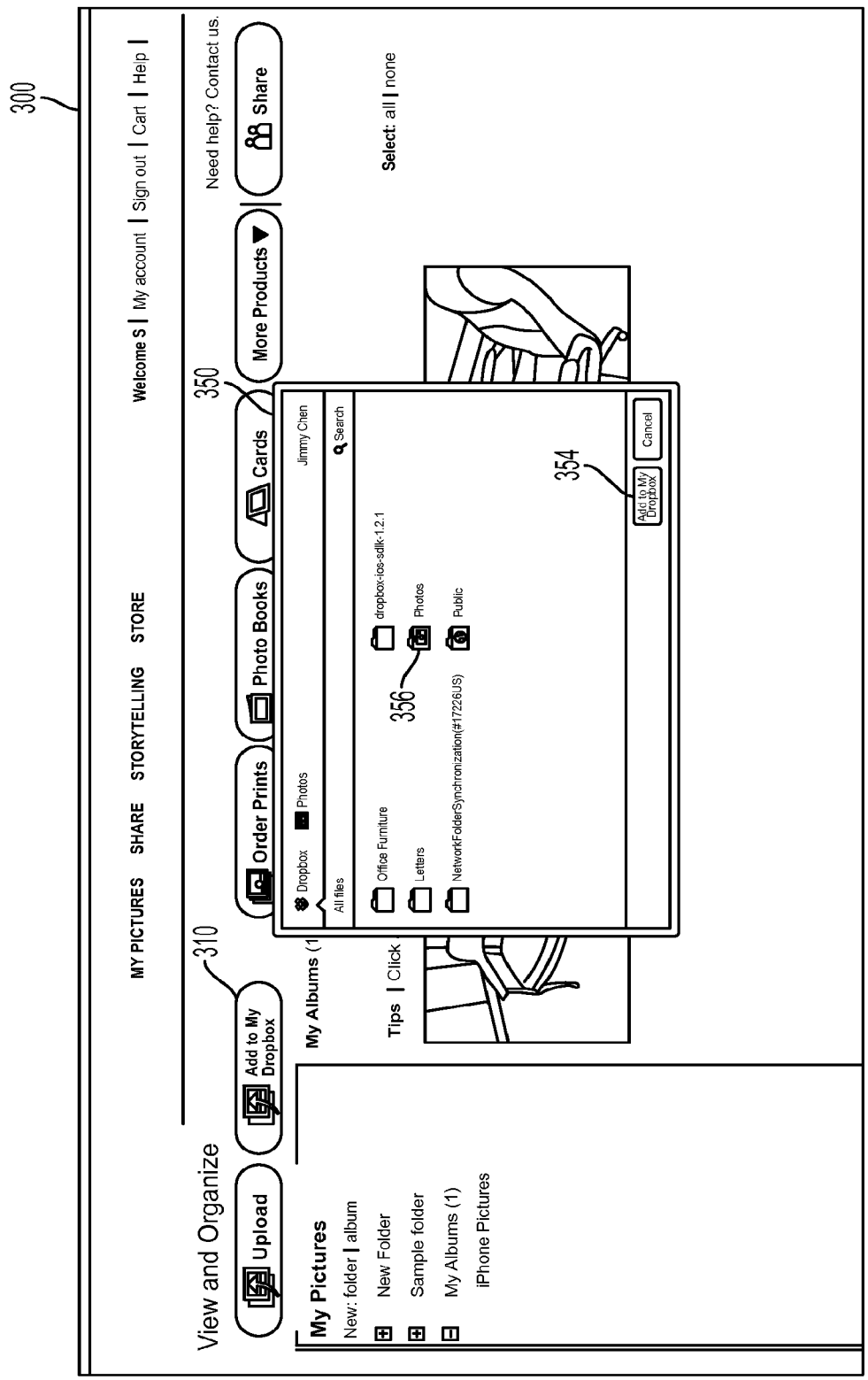
FIG. 6 shows a file destination selection interface according to a particular embodiment.

As shown in FIG. 5, once the user has selected one or more files 324 to add to their content management system account from the third party site, the user can activate (e.g., click on) Select Button 326, in response to which, as shown in FIG. 6, the system may be configured to display destination interface 350. As may be understood from this figure, the system may be configured to allow a user to select a destination directory (e.g., folder) in the user's content management system account to which the user desires to add the selected files or folders from the third party site. For example, because, in this case, the third party site is a photo storage site, the user may select Photos Folder 356 in the user's content management system account as the folder to which the user wishes to download the files (e.g., image files) from the third party site. Once the user has selected a destination folder in the user's content management system account, the user may select "Add to My Dropbox" Button 354 to initiate the download of the selected files and/or folders from the third party website to the user's content management system account.

Figure 7:
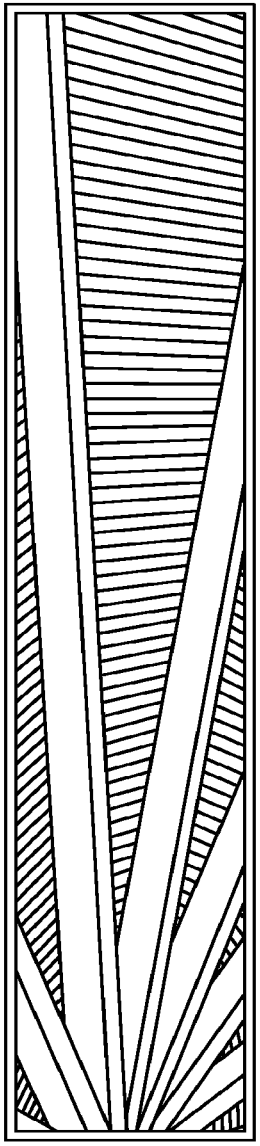
FIG. 7 shows a website that includes a file download widget according to a further embodiment.

FIG. 7 shows another embodiment of a system for downloading one or more files from a third party website to a content management system. As shown in this figure, individual's personal web log 400 (e.g., blog), for example, may include multiple "Add to My Dropbox" Buttons 410 that visitors to the blog may select to add files made available on the blog to their respective content management system accounts. In various embodiments, these "Add to My Dropbox" Buttons 410 may be placed on the third party site by an owner of the third party site.

In various embodiments, the owner may add "Add to My Dropbox" Buttons 410 to their website by pasting suitable HTML code into the site. This code may, for example, be generated by the content management system and provided to the owner of the website in the manner discussed above, or in any other suitable manner.

In particular embodiments, "Add to My Dropbox" Button 410 may be associated with a specific file (or plurality of files) that the owner wishes to make available to users that access the third party site. The system may be configured so that, when a user selects "Add to My Dropbox" Button 410, the system adds the specific file or files to the user's account within the content management system. In various embodiments, during this process, the system may require the user to log in to their content management system account in order to facilitate the download of the file to the account. Alternatively, if the user is logged into their account when the download is initiated, the system may facilitate the download of the file into the user's account without further input from the user.

As a particular example, in blog 400 shown in FIG. 7, if a user were to select "Add to My Dropbox" Button 410A below the blog entry relating to a recording of the blog owner's cover band, the system may save (e.g., automatically) a song file associated with "Add to My Dropbox" Button 410A to the user's content management system account.

Similarly, if the user selects "Add to My Dropbox" Button 410B below the blog entry relating to the video of the blog owner's nephew, the system may automatically save a video associated with the Button 410B to the user's content management system account.

Additional Configuration Considerations

The disclosure herein has been described in particular detail with respect certain embodiments. Those of skill in the art will appreciate that other embodiments may be practiced. First, the particular naming of the components and variables, capitalization of terms, the attributes, data structures, or any other programming or structural aspect may not be mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead be performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments disclosed herein include process steps and instructions described herein in the form of an algorithm. It should be noted that the process steps and instructions could be embodied in software, firmware, or hardware, and when embodied in software, could be downloaded to reside on and be operated from different platforms used by real time network operating systems.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for enablement and best mode of the present invention.

It also should be understood that, while various embodiments are described above in terms of computer-implemented methods, other embodiments include a system and/or a non-transitory computer-readable storage medium for creating and using file download widgets to provide access to files stored on a content management system according to the techniques described above.

The embodiments disclosed herein are well suited to a wide variety of computer network systems over numerous topologies. Within this field, the configuration and management of large networks include storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure herein is intended to be illustrative, but not limiting, of the scope of the invention, which is set forth in the following claims.

What is claimed is:

1. A computer-implemented method comprising:
   receiving, by a content management system, an indication of an activation of a content item download widget presented on a website; and
   downloading, in response to the indication, a content item selected from the website to a user account within the content management system, wherein the downloading is based on a determination that the content item is not already stored within the content management system, and wherein downloading the content item to the user account within the content management system comprises receiving the content item directly from the website at one or more servers associated with the content management system.

2. The computer-implemented method of claim 1, wherein receiving the content item directly from the website at the one or more servers associated with the content management system comprises downloading the content item directly from one or more servers associated with the website to the one or more servers associated with the content management system.

3. The computer-implemented method of claim 1 further comprising:
   receiving a link to the content item.

4. The computer-implement method of claim 3, wherein the link is a URL.

5. The computer-implemented method of claim 1, wherein downloading the content item to the user account within the content management system further comprises associating the content item with the user account.

6. The computer-implemented method of claim 5 further comprising:
   receiving account information for the user account; and
   using the account information to associate the content item with the user account within the content management system.

7. The computer-implement method of claim 1, wherein the website is a third-party website not associated with the content management system.

8. The computer-implemented method of claim 1, wherein the downloading of the content item on the website comprises allowing initiation of the content item download by a client device then completing download after the client device has disconnected from the website.

9. The computer-implemented method of claim 1, wherein, in response to the indication, the content item is downloaded to the content management system from the website without first downloading the content item to a client device.

10. A computer-implemented method comprising:
    providing, to a website, a content item download widget that is configured so that, in response to a content item access widget being activated, a content item on the website is:
       downloaded directly to a content management system from one or more servers associated with the website based on a determination by the content management system that the content item is not already stored within the content management system; and
       associated with a user account within the content management system.

11. The computer-implemented method of claim 10 further comprising:
    generating computer code for implementing the content item download widget on the website; and
    providing the computer code for implementing the content item download widget on the website.

12. The computer-implement method of claim 11, wherein the computer code uses a link to facilitate the download of the content item to the content management system.

13. The computer-implemented method of claim 12, wherein the link is a URL.

14. The computer-implemented method of claim 10, wherein the content item download widget is configured for a specific content item on the website.

15. The computer-implemented method of claim 10, wherein the content item download widget is configured to allow selection of one or more content items for download from the website.

16. The computer-implemented method of claim 10, wherein the content item download widget is further configured so that, in response to the content item access widget being activated, the content item on the website is downloaded by allowing initiation of the content item download by a client device then completing download after the client device has disconnected from the website.

17. A computer-implemented method comprising:
    receiving, by a content management system, an indication of an activation of a content item download widget presented on a website;
    determining, in response to the indication, whether the content item is already stored within the content management system;
    downloading, in response to determining that the content item is not already stored within the content management system, the content item from the website to the content management system and associating the content item with a user account within the content management system, wherein downloading the content item to the content management system comprises receiving the content item directly from the website at one or more servers associated with the content management system; and
    associating, in response to determining that the content item is already stored within the content management system, the content item already stored within the content management system with the user account.

18. The computer-implemented method of claim 17, wherein receiving the content item directly from the website at the one or more servers associated with the content management system comprises downloading the content item directly from one or more servers associated with the website to the one or more servers associated with the content management system.

19. The computer-implemented method of claim 17 further comprising:
    receiving account information for the user account; and
    using the account information to associate the content item with the user account within the content management system.

20. The computer-implemented method of claim 17, wherein the downloading of the content item on the website comprises allowing initiation of the content item download by a client device then completing download after the client device has disconnected from the website.

21. A content management system comprising:
    one or more processors; and
    at least one non-transitory computer-readable storage medium having stored therein instructions which, when executed by the one or more processors, cause the content management system to:
        receive an indication of an activation of a content item download widget presented on a website; and
        download, in response to the indication, a content item selected from the website to a user account within the content management system, wherein the downloading is based on a determination that the content item is not already stored within the content management system, and wherein downloading the content item to the user account within the content management system comprises receiving the content item directly from the website at one or more servers associated with the content management system.

22. A non-transitory computer-readable storage medium having stored therein instructions which, when executed by one or more processors, cause the one or more processors to:
    receive, via a content management system, an indication of an activation of a content item download widget presented on a website; and
    download, in response to the indication, a content item selected from the website to a user account within the content management system, wherein the downloading is based on a determination that the content item is not already stored within the content management system, and wherein downloading the content item to the user account within the content management system comprises receiving the content item directly from the website at one or more servers associated with the content management system.

23. A content management system comprising:
    one or more processors; and
    at least one non-transitory computer-readable storage medium having stored therein instructions which, when executed by the one or more processors, cause the content management system to:
        receive an indication of an activation of a content item download widget presented on a website;
        determine, in response to the indication, whether the content item is already stored within the content management system;
        download, in response to determining that the content item is not already stored within the content management system, the content item from the website to the content management system and associating the content item with a user account within the content management system, wherein downloading the content item to the content management system comprises receiving the content item directly from the website at one or more servers associated with the content management system; and
        associate, in response to determining that the content item is already stored within the content management system, the content item already stored within the content management system with the user account.

24. A non-transitory computer-readable storage medium having stored therein instructions which, when executed by one or more processors, cause the one or more processors to:
    receive an indication of an activation of a content item download widget presented on a website;
    determine, in response to the indication, whether the content item is already stored within the content management system;
    download, in response to determining that the content item is not already stored within the content management system, the content item from the website to the content management system and associating the content item with a user account within the content management system, wherein downloading the content item to the content management system comprises receiving the content item directly from the website at one or more servers associated with the content management system; and
    associate, in response to determining that the content item is already stored within the content management system, the content item already stored within the content management system with the user account.

* * * * *